United States Patent [19]

Doyle et al.

[11] Patent Number: 5,003,386
[45] Date of Patent: Mar. 26, 1991

[54] PREPARATION OF A COPY HOLOGRAM WITH A LIGHT MODULATING ARRAY DERIVED FROM A MASTER HOLOGRAM

[75] Inventors: James Doyle, Wilmslow; Antony I. Hopwood, Bollington, both of United Kingdom

[73] Assignee: Ilford Limited, Cheshire, United Kingdom

[21] Appl. No.: 447,994

[22] Filed: Dec. 8, 1989

[30] Foreign Application Priority Data

Dec. 20, 1988 [GB] United Kingdom ............... 8829697

[51] Int. Cl.⁵ .......................................... H04N 13/00
[52] U.S. Cl. ................................... 358/90; 350/3.69; 350/3.83
[58] Field of Search ............... 358/90, 2; 350/3.6, 350/3.61, 3.66–3.71, 3.75, 3.83

[56] References Cited

U.S. PATENT DOCUMENTS

| | | | |
|---|---|---|---|
| 4,376,950 | 3/1983 | Brown et al. | 358/2 X |
| 4,832,424 | 5/1989 | McGrew | 350/3.69 X |
| 4,895,419 | 1/1990 | Doyle et al. | 350/3.71 X |

Primary Examiner—Victor R. Kostak
Attorney, Agent, or Firm—Darby & Darby

[57] ABSTRACT

A method of preparing a copy hologram from a master hologram in which the light employed in the copying process is modified by passing an exposing beam through a light modulating array. At least some members of the array have modified light transmissivities in accordance with information derived from a reconstruction of the master hologram.

9 Claims, 2 Drawing Sheets

PREPARATION OF A COPY HOLOGRAM WITH A LIGHT MODULATING ARRAY DERIVED FROM A MASTER HOLOGRAM

This invention relates to the copying of holograms. It is usual to produce copies of reflection holograms from a reflection master hologram but recently a method has been found whereby reflection copies of holograms can be prepared from a transmission master hologram. Such method is described in our copending U.S. Pat. application, Ser. No. 07/308,662, entitled "Contact Copying of Reflection or Volume Holograms." However, whatever the method employed, very often the master hologram when reconstructed exhibits undesired highlights or areas which are too dark. It is not possible to cure such faults during the copying process by the burning-in or dodging techniques employed when preparing positive prints from negatives in the usual photographic enlarging method.

We have found a method of reducing the undesirable effects of highlights and dark areas present in master holograms when copying holograms therefrom.

Therefore, according to the present invention there is provided a method of preparing a copy hologram from a master hologram which is characterized in that the light employed in the copying process is modified by passing at least one exposing beam through a light modulating array, some members at least of said array having had their light transmissivities modified in accordance with information derived from a reconstruction of the master hologram.

Preferably, the light modulating array is an array of liquid crystal pixels known as a liquid crystal display device (LCD). However, useful light modulating arrays may be made from other materials such as those described in U.S. Pat Nos. 4,375,649 and 4,378,568, these entire disclosures being incorporated herein by reference. Some of the materials described in these specifications are electro-optical materials transformable by an electric field from a non-polar, isotropic state to a polar birefringent state.

Preferably, the optical density of each member or pixel in the light modulating array can be altered to give a range of light transmission densities.

The light modulating array is preferably an X-Y array when an expanded beam is used as the exposing beam. The light modulating array is preferably an X array when a scanning beam is used as the exposing beam.

The method of the present invention may be used to produce reflection hologram copies from a transmission master or to produce reflection hologram copies from a reflection master.

In a particularly useful method of producing reflection copies from a transmission master, a laser beam is split to form an object beam which passes through the transmission master and is modified thereby and enters the light-sensitive holographic material where it interferes with the reference beam to form the holographic interference fringes. In this method, preferably, it is the object beam which is modified by passing it through the light modulating array. However, the reference beam could also be so modified or indeed both the object and reference beams could be so modified.

When a reflection hologram is copied from a reflection master, usually the light-sensitive holographic material is placed substantially in contact with the reflection master and the laser beam passes through the holographic material into the reflection master where it is modified by the holographic image therein and is reflected back into the holographic material so forming the object beam.

Thus, in this case, preferably, the laser beam which is used to expose the holographic material passes through the light modulating array before it enters the holographic material. However, if a very thin light modulating array is used, then this can be sandwiched between the holographic material and the reflection master so that the object beam may be modified by the light modulating array.

One useful method of modifying the light transmissivities of the light modulating array members in accordance with information derived from a reconstruction of the master hologram is to reconstruct the master hologram and then prepare video signals representative of this image by use of a video camera placed along the axis to be used for viewing the holographic copies, digitizing the video signals and storing them and then using the stored signals to modify the elements of the light modulating array.

The stored signals may be fed to a visual display unit such as a television screen via a transforming unit, and a reconstruction of the master hologram in two dimensions is then displayed. This will show up all the undesirable highlight and dark shadow areas in the reconstructed image of the master hologram. This image can then be corrected by use of a keyboard of a mouse to alter the transformation applied to the image before display. This could be either on a point-by-point basis or by altering the numerical algorithm which relates the appearance of the reconstructed hologram to the appearance of the displayed image.

This alters in real time the image on the television screen. When the viewed image on the television screen appears to be satisfactory, the stored signals from the transforming unit are fed to the light modulating array and there they modify its light transmissivity selectively. The master hologram is then used to print copies by using laser light to pass through the master, at least one exposing beam being modulated by passing it through the light modulating array which has had its transmissivity selectively modified, thus compressing the highlight and dark shadow tonal values to achieve a better match between the master hologram and the photosensitive copy material. Preferably the digitized video signals are stored on a disc, but they may be stored by any convenient digital or analog means such as a matrix array.

In this method of modifying the array of light values as just described, an operator looks at the reconstructed two-dimensional representation of the holographic image and decides how it should be modified. However, when the sensitometric characteristics of the photosensitive material to be used as the copying material are well known, it is possible to employ a socalled look-up table which has been calibrated using these characteristics. In this case, the stored signals are passed to the transforming unit in the apparatus and the results read off by the "look-up table" which automatically modifies the transmittances of some of the elements of the light value array without an operator playing any part in the process.

The method of the present invention is preferably used when reflection hologram are copies from a transmission master. In one of our co-pending applications, there is described a method of preparing a reflection hologram which comprises mounting a master transmission hologram in register with a sheet or length of transparent photosensitive holographic material, there being present therebetween means to cut out zero order light transmitted through the transmission hologram, there further being present on each side of the assembly which comprises the hologram and the holographic material a light reflecting surface, then causing a split beam from a laser source to expose both the whole surface of the transmission hologram and the holographic material by directing the beams on to both reflecting surfaces and on passing through the transmission hologram, said one beam takes up the image information and passes through the means to cut out the zero order light to the transparent photosensitive holographic material where said one beam interferes with the other beam which is reflected from the other reflecting surface in to the holographic material, the two split portions of the beam being maintained in registration, and then processing the holographic material to fix the holographic image therein.

In one method, the split beam from the laser source scans over both the whole surface of the transmission hologram and the holographic material.

In another method, the split beam is derived from a laser source which provides a single overall exposure of the photosensitive holographic material. Preferably this laser source is a pulsed laser source as this gives the shortest exposure time. A suitable laser for use in this method is a pulsed ruby laser.

This latter method is shown in the accompanying FIG. 1, which illustrates the method of the present invention.

FIG. 2 shows the flow diagram of the pieces of equipment required to modify the light modulating array which in this case is a liquid crystal matrix.

According to another aspect of the present invention, there is provided an apparatus for carrying out the method as just described which comprises a means for reconstructing a master hologram, means for preparing video signals representative of the reconstructed hologram, means for digitizing these video signals and storing them, a light modulating array and means for altering the transmissiveness of members of the light modulating array based on the information derived from the stored signals.

Preferably the means for preparing video signals representative of the reconstructed hologram is a video camera.

Preferably viewing means are provided for displaying a reconstruction of the master hologram in two dimensions. Most preferably this viewing means is a television screen.

Preferably the digitized video signals are stored in a disc. Suitable discs include magnetically or electrically encoded computer (floppy) discs, or optically encoded compact discs of the type that may be read with a laser light beam.

The accompanying figures will serve to illustrate the present invention.

Figure 1:
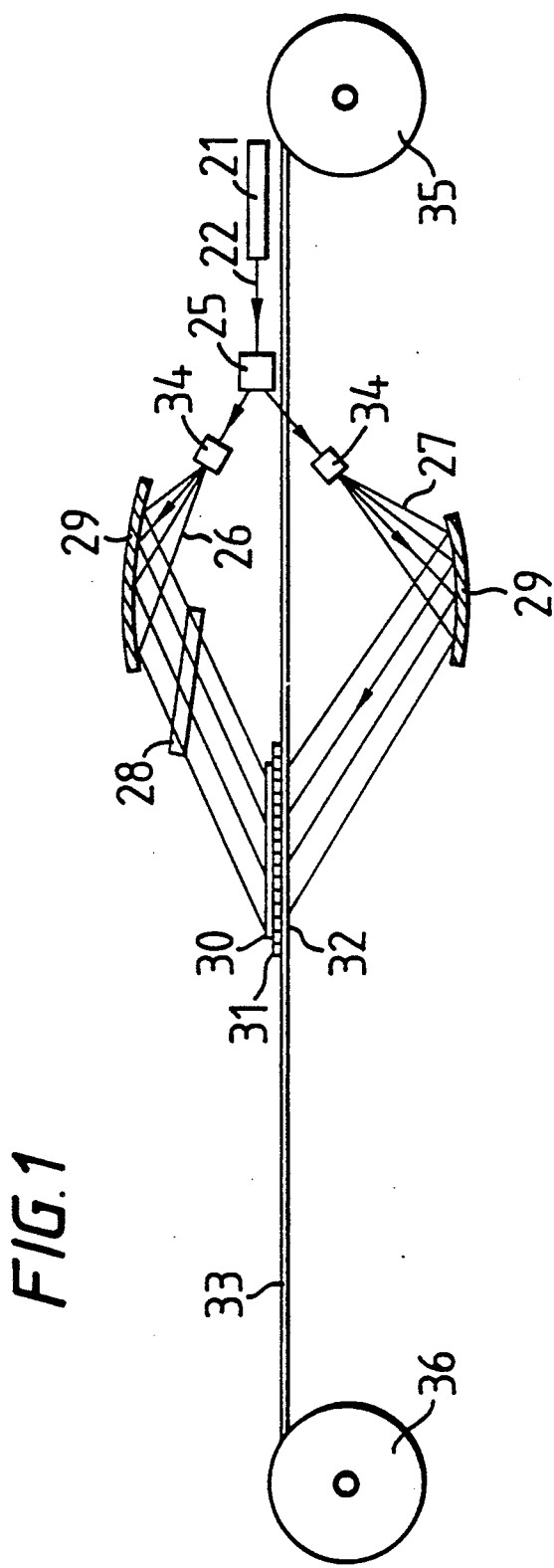
FIG. 1 is a front side view of a holographic copying apparatus.

In FIG. 1, a pulsed ruby laser source 21 produces a laser beam 22 which is directed through a beam splitting device 25 which splits the beam 22 into two beams 26 and 27. Beam 26 is directed towards a silvered concave mirror 29 via a beam expanding means 34 and is reflected from the mirror 29 via a liquid crystal matrix 28 through a transmission hologram 30 and then via a louvre filter 31 (which cuts out zero order light) into one portion 32 of a long length of silver halide sensitized holographic film material 33. Beam 27 is directed towards a silvered concave mirror 29 via a beam expanding means 34 and is reflected from the mirror 29 into the same portion 32 of the film material 33 where it interferes with beam 26 during the overall single pulse emitted by the laser source 21.

Beam 26 can be considered to be the replay beam or object beam as it carries the information from the transmission hologram 30 into the film material 33 and beam 27 can be considered to be the reference beam. Beams 26 and 27 are in registry when they interfere in the film material 33.

The unexposed film 33 is stored on the spool 35 and the exposed firm is reeled up on the spool 36. Spool 36 is a driven spool and it rotates to reel up a predetermined length of exposed film 33 after each pulse from the laser source 21 and at the same time causing an equivalent length of film 33 to be unreeled from spool 35. This ensures that at each pulse exposure a fresh portion 32 of unexposed film 33 is present below the louvre filter 31.

After all film 33 has been exposed and reeled up on spool 36 the exposed film can be processed to fix the holographic image fringes therein.

The set-up as described with reference to FIG. 1 is of particular use in producing a plurality of copies of the hologram 30 on the length of photosensitive film 33 but of course the hologram 30 can be changed at any time during the exposure sequences.

With reference to FIG. 1, it is to be understood that the optics are such that the beam 27 coming from the beam splitting means 25 does not cross directly the path of the photosensitive material 33.

Figure 2:
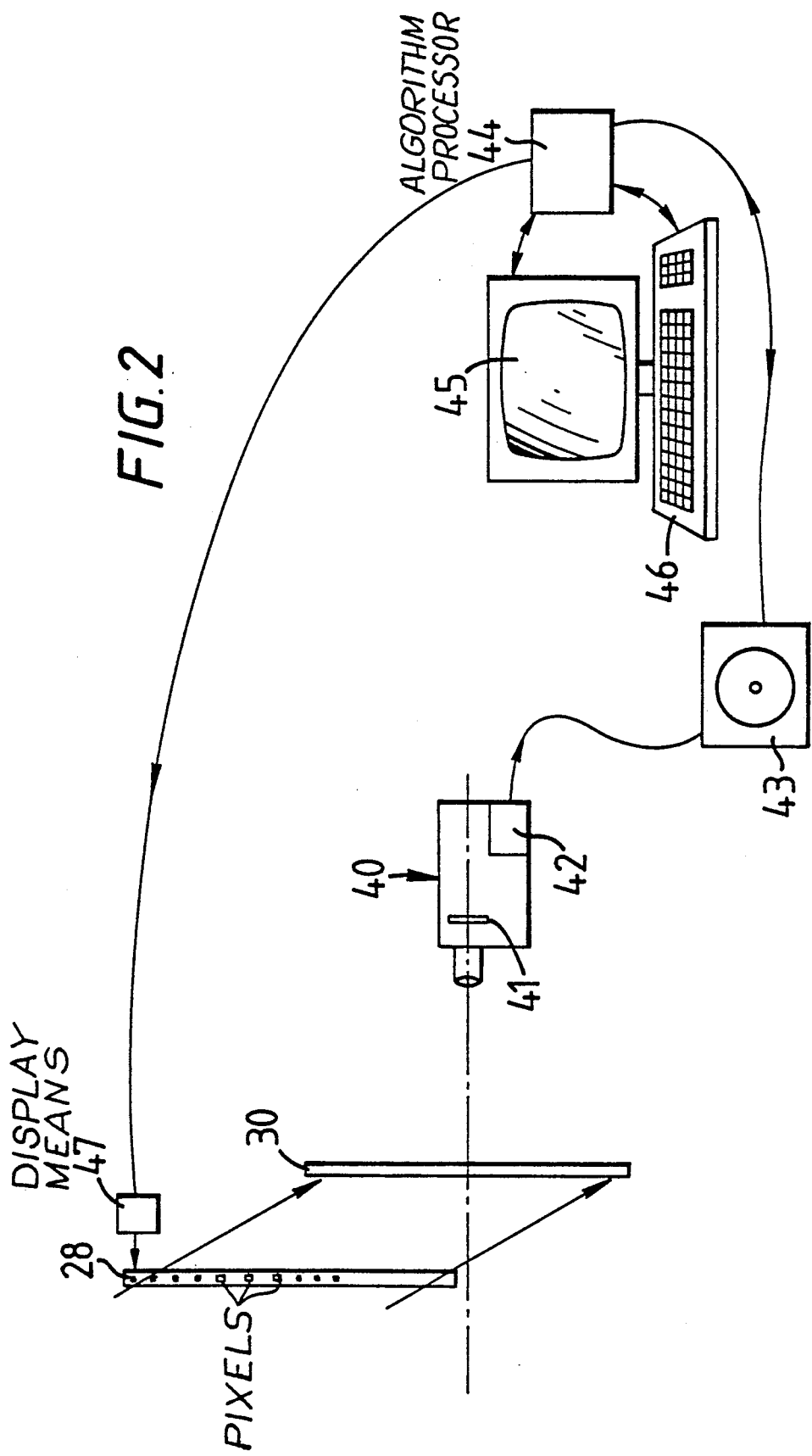
FIG. 2 is a block diagram of the apparatus used to modify the members of the light modulating array with regard to their transmissiveness.

In FIG. 2, there is shown the hardware and sequence of events used to modify the liquid crystal matrix 28.

In FIG. 2, there is shown the transmission hologram 30, a video camera 40, a charge coupled device 41 (CCD) which is present in the camera 40, an analog/digital convertor 42, a disc storage means 43, a numerical algorithm 44, a television screen 45, a keyboard 46, a display means 47 and the liquid crystal matrix 28.

In operation, before the transmission hologram 30 is exposed on to the film material 33 as just described, the transmission hologram is reconstructed using laser light. The video camera 40 is placed along the axis at which the copy hologram should be viewed, then it captures a two-dimensional image of the reconstructed image in the hologram 30. This is recorded in the CCD 41, and the recorded signals are passed via the A/D converter 42 to the disc storage means 43. The stored signals on disc 43 can then be fed to the television screen 45, on which can be seen the two-dimensional image of the reconstructed hologram in the transmission hologram 30 via the numerical algorithm 44.

The two-dimensional image of the reconstructed hologram will show up any undesirable highlights or dark shadow areas. The keyboard 46 is then operated to remove such highlight or dark shadows via the numerical algorithm 44.

Thus, when the laser beam 26 exposes the photosensitive film material 33 via the concave mirror 29 and the transmission hologram 30, it will have been modified by the liquid crystal matrix 28 so that when the material 33 has been exposed and processed the reconstructed hologram will exhibit no undesirable highlight nor dark shadow areas because of compression of the tonal values. It is to be understood that the function of the numerical algorithm 44 is to transform stored image information to information having a smaller dynamic range.

The numerical algorithm may be connected to a "look-up table" which is calibrated with the sensitometric properties of the film material 33 and thus may function to reduce the dynamic range of the stored image information in conjunction with an operator or automatically without the assistance of an operator.

It is to be understood that the keyboard 46 may be replaced by a so-called mouse to alter the image of the television screen 45.

We claim:

1. A method of preparing a copy hologram from a master hologram, in which the light employed in the copying process is modified by passing at least one exposing beam through a light modulating array comprising an array of liquid crystal pixels, at least some members of said array having had their light transmissivities modified in accordance with information derived from a reconstruction of the master hologram.

2. A method according to claim 1 characterized in that the optical density of each pixel in the array can be altered to give a range of light transmission densities.

3. A method of preparing a copy hologram from a master hologram, in which the light employed in the copying process is modified by passing at least one exposing beam through a light modulating array, at least some members of said array having had their light transmissivities modified in accordance with information derived from a reconstruction of the master hologram, wherein video signals representative of the reconstruction are obtained by directing a video camera along the axis to be used for viewing the holographic copies, digitizing the video signals and storing the digitized signals, to provide the information for modifying the elements of the light modulating array whose light tramsmissivities are to be modified.

4. A method according to claim 3 characterized in that the stored signals are fed to a visual display unit via a transforming unit and a reconstruction of the master hologram in two dimensions is then displayed.

5. Apparatus for preparing a copy hologram from a master hologram comprising:
   means for reconstructing a master hologram,
   means for preparing video signals representative of the reconstructed hologram,
   means for digitizing the video signals and for storing the digitized video signals,
   a light modulating array,
   means for passing at least one exposing beam through the light modulating array to prepare the copy hologram, and
   means for altering the transmissiveness of members of the light modulating array based on information derived from the stored digitized video signals.

6. An apparatus according to claim 5 characterized in that the means for preparing video signals representative of the reconstructed hologram is a video camera.

7. An apparatus according to claim 5 characterized in that there is provided viewing means for displaying a reconstruction of the master hologram in two dimensions.

8. An apparatus according to claim 5 characterized in that the light modulating array is a pixel array of liquid crystals.

9. A method of preparing a copy hologram from a master hologram, in which the light employed in the copying process is modified by passing at least one expanded exposing beam through an X-Y light modulating array, at least some members of said array having had their light transmissivities modified in accordance with information derived from a reconstruction of the master hologram.

* * * * *